2 Sheets—Sheet 1.

J. RICHTER.
HAY-LOADERS.

No. 184,174. Patented Nov. 7, 1876.

WITNESSES:
W. W. Hollingsworth
C. C. Kenon

INVENTOR:
Joseph Richter
BY 
ATTORNEYS.

2 Sheets—Sheet 2.

J. RICHTER.
HAY-LOADERS.

No. 184,174. Patented Nov. 7, 1876.

UNITED STATES PATENT OFFICE.

JOSEPH RICHTER, OF LAKETOWN, MINNESOTA.

IMPROVEMENT IN HAY-LOADERS.

Specification forming part of Letters Patent No. 184,174, dated November 7, 1876; application filed June 6, 1876.

*To all whom it may concern:*

Be it known that I, JOSEPH RICHTER, of Laketown, in the county of Carver and State of Minnesota, have invented a new and Improved Combined Hay Rake and Loader; and I do hereby declare that the following is a full, clear, and exact description of the same, reference being had to the accompanying drawing, forming part of this specification, in which—

Figure 1:
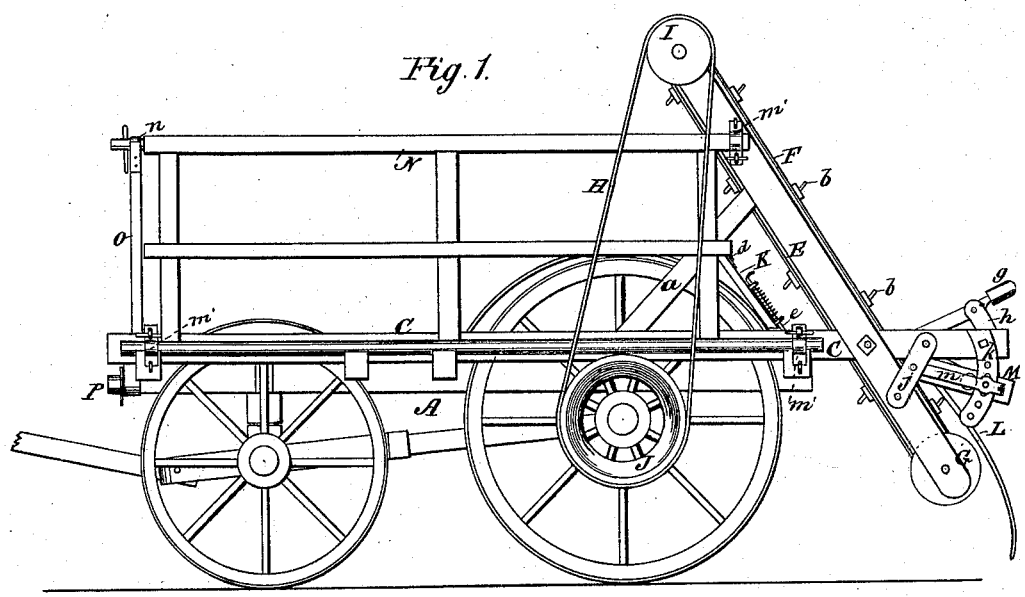
Figure 2:
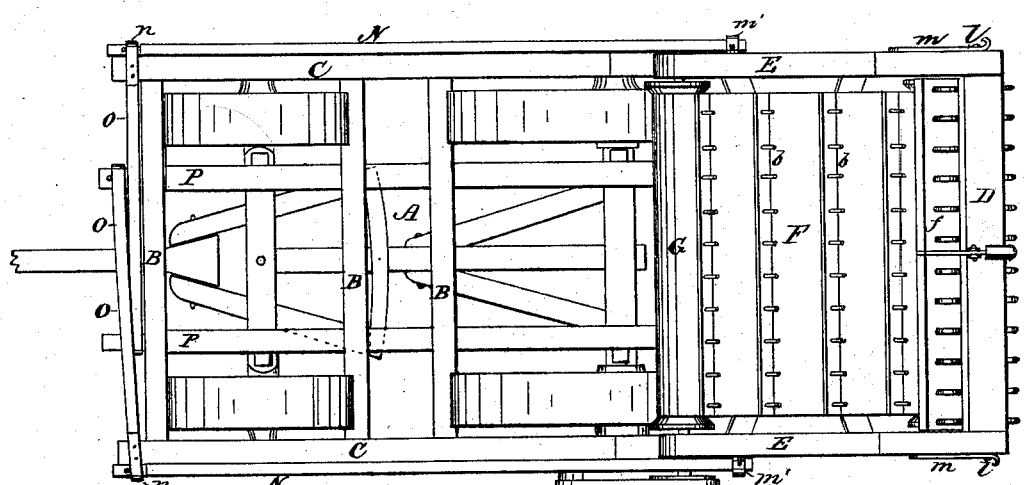
Figure 2:
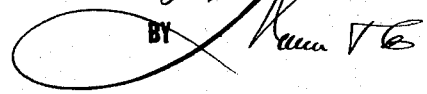
Figure 3:
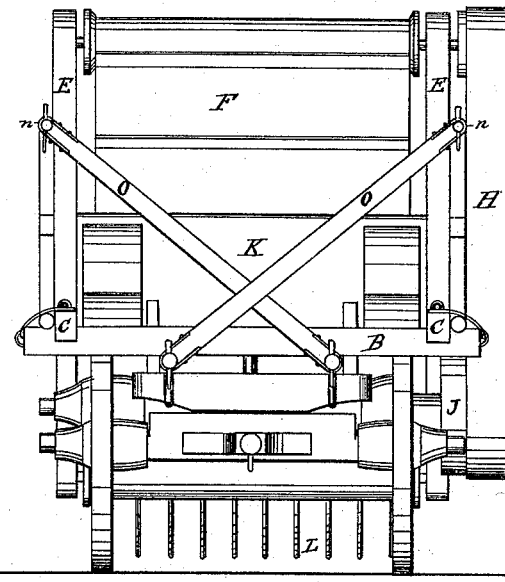
Figure 4:
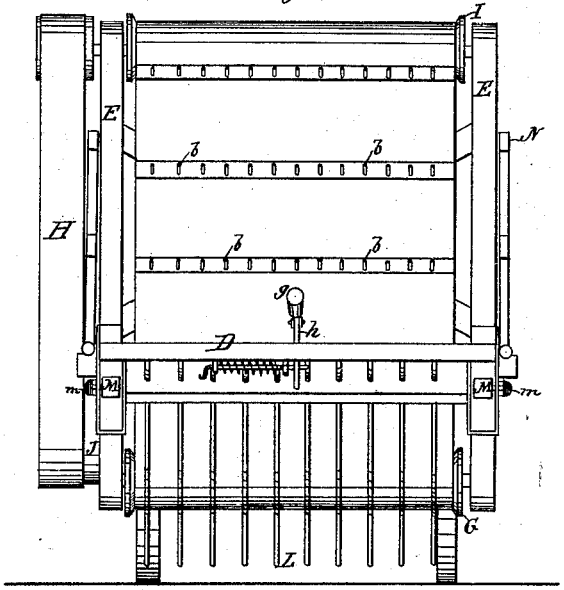

Figure 1 is a side elevation; Fig. 2, a plan; Fig. 3, a front elevation; Fig. 4, a rear elevation.

My invention relates to certain improvements in that class of devices which are designed for loading wagons with hay, straw, or grain. It belongs to that type of loaders in which an adjustable rake gathers up the hay and delivers it to an endless revolving apron provided with teeth, which apron is operated by a band-and-pulley connection with one of the driving-wheels, and delivers the hay to the top of the wagon.

The invention consists in the particular construction, arrangement, and adjustments of the loading devices.

In the drawing, A represents a wagon of the construction ordinarily employed for transporting hay. Upon the outer extremities of the transverse bars B are arranged, upon each side, the longitudinal rails C, which are connected at the rear by an end bar, D, and upon which are constructed the inclined bars E, which, with braces a, form a frame that carries the endless apron. F is the endless apron, which extends around rollers G, and is armed with rows of teeth b, which catch the hay and cause it to be carried up with the apron. This apron and frame are arranged inclinedly at the rear of the wagon, and the apron is revolved by means of a belt, H, which passes around a pulley, I, on one of the rollers, and a second pulley, J, formed upon the hub of one of the running-wheels, the said pulley consisting of a plain rim attached to the hub by a second set of short spokes. K is a board, arranged inclinedly and parallel with the apron, upon the side next to the wagon, which is intended to keep the hay away from the teeth of the elevator-apron while descending, and thus prevent the dragging off of the load. Said board is detachably fastened to the braces a and the rails C by means of a tenon, d, let into a mortise in the brace and a spring-bolt, e, engaging with a hole in the rails C. L is the rake, located near the bottom of the apron, and adapted to gather up the hay as the wagon passes along, so that the elevator-teeth may catch the same and carry it up into the wagon. Said rake has a head, f, which is pivoted in arms M, and an adjusting-lever, g, with a perforated curved bar, h, that passes through the end bar D. This lever g serves to regulate the adjustment of rake upon its pivot, and by means of the same the rake may be thrown into or out from the apron, a spring-bolt, i, upon the under side of bar D serving to enter the perforations of the curved bar h, and hold the rake to any desired adjustment. The arms M, carrying the rake, are also pivoted in the angles of rails C and bars E, to plates j, and their outer ends move and are adjusted in perforated straps or loops k, being held to their position in said straps by a locking-bolt, l, attached to a spring-arm, m, which is pivoted upon the same pivot with the arm M.

By means of the adjustment just described I am enabled to adjust the rake vertically at the proper distance from the ground; thus, for marsh-meadows the rake will be elevated, and the locking-bolt secured in the higher perforations of the straps, while for high and dry meadows it will be set lower down.

To assist in the loading of the wagon, and prevent the man from falling off, a set of detachable frames, N, are fastened to the sides of the wagon, which frames are fastened by means of hasps m', and are braced in front by cross-bars O, which carry metallic straps n at their ends that fit over the rounded ends of the frames N, and the rounded projecting ends of the longitudinal body-rails P.

From the above description it will be seen that the wagon is loaded by being driven across the field containing the cut hay, the rake serving to gather up the hay, while the elevator carries it up and delivers it upon the wagon.

The devices, as shown, are constructed upon the wagon; but they may be made detachable, if desired, and are capable of being readily attached to any wagon.

Having thus described my invention, what I claim as new is—

The combination, with the rails C and inclined elevator-frame E, of the arms M, pivoted in angle formed by the said rails and frame, the perforated straps $k$, and spring-arms $m$, carrying locking-bolt $l$, and fastened upon the same pivot with the arms M, substantially as and for the purpose described.

JOSEPH RICHTER.

Witnesses:
F. E. Du Toit,
L. Strackens.